(12) United States Patent
Lobscheid

(10) Patent No.: US 10,847,272 B2
(45) Date of Patent: Nov. 24, 2020

(54) CONTROL ROD DRIVE MECHANISM (CRDM) WITH REMOTE DISCONNECT MECHANISM

(71) Applicant: NuScale Power, LLC, Corvallis, OR (US)

(72) Inventor: Christian Lobscheid, Corvallis, OR (US)

(73) Assignee: NuScale Power, LLC, Corvallis, OR (US)

( * ) Notice: Subject to any disclaimer, the term of this patent is extended or adjusted under 35 U.S.C. 154(b) by 217 days.

(21) Appl. No.: 15/858,727

(22) Filed: Dec. 29, 2017

(65) Prior Publication Data

US 2018/0190392 A1  Jul. 5, 2018

Related U.S. Application Data

(60) Provisional application No. 62/441,015, filed on Dec. 30, 2016.

(51) Int. Cl.
| | | |
|---|---|---|
| *G21C 7/14* | (2006.01) | |
| *G21C 9/02* | (2006.01) | |
| G21C 1/32 | (2006.01) | |
| G21C 7/117 | (2006.01) | |

(52) U.S. Cl.
CPC ............. *G21C 7/14* (2013.01); *G21C 9/02* (2013.01); *G21C 1/32* (2013.01); *G21C 7/117* (2013.01); *Y02E 30/39* (2013.01)

(58) Field of Classification Search
CPC ... G21C 7/14; G21C 9/02; G21C 1/32; G21C 7/117

USPC .................................... 376/228, 232, 233
See application file for complete search history.

(56) References Cited

U.S. PATENT DOCUMENTS

| | | |
|---|---|---|
| 65,169 A | 5/1867 | Card |
| 1,159,262 A | 11/1915 | Ottum |
| 1,580,352 A | 4/1926 | Ventresca |
| 1,897,561 A | 2/1933 | Manucci |
| 2,179,594 A | 6/1938 | Johnson |

(Continued)

FOREIGN PATENT DOCUMENTS

| | | |
|---|---|---|
| EP | 225511 | 6/1987 |
| EP | 811990 | 12/1997 |

(Continued)

OTHER PUBLICATIONS

Lee Mason; NASA Kilopower Overview and Mission Applications (NASA Presentation, Las Vegas, Jan. 18, 2018); 18 pages.

(Continued)

*Primary Examiner* — Jack W Keith
*Assistant Examiner* — Daniel Wasil
(74) *Attorney, Agent, or Firm* — Perkins Coie, LLP

(57) ABSTRACT

The drive assembly includes annular drive magnets extending around a top end of a drive shaft and annular drive coils extending around the drive magnets, separated by a pressure boundary. A latch assembly is coupled to the drive magnets and engages with the drive shaft in response to actuation of the drive assembly. The drive coils also rotate the drive magnets and the engaged latch assembly to axially displace the drive shaft. Deactivating the drive coils disengages the latch assembly from the drive shaft, dropping a connected control rod assembly via gravity into a nuclear fuel assembly.

12 Claims, 16 Drawing Sheets

(56) References Cited

U.S. PATENT DOCUMENTS

| | | |
|---|---|---|
| 2,445,106 A | 2/1946 | Dempster |
| 2,518,621 A | 8/1950 | Hull et al. |
| 2,894,779 A | 7/1959 | Kushner |
| 2,961,393 A | 11/1960 | Monson |
| 2,968,205 A | 1/1961 | Springate |
| 3,036,964 A | 5/1962 | Horning |
| 3,107,209 A | 10/1963 | Frisch |
| 3,346,549 A | 10/1967 | Ford |
| 3,595,748 A | 7/1971 | Frisch et al. |
| 3,625,816 A | 12/1971 | Aleite |
| 3,734,825 A | 5/1973 | Schabert |
| 3,929,305 A | 12/1975 | Sabol |
| 3,935,063 A | 1/1976 | Dunckel |
| 3,992,255 A * | 11/1976 | DeWesse ............... G21C 7/12 376/228 |
| 4,120,172 A | 10/1978 | Pierce |
| 4,134,789 A | 1/1979 | Aubert |
| 4,147,589 A | 4/1979 | Roman et al. |
| 4,437,054 A | 5/1984 | Veronesi |
| 4,472,348 A | 9/1984 | Desfontaines |
| 4,481,164 A | 11/1984 | Bollinger |
| 4,484,093 A | 11/1984 | Smith |
| 4,544,521 A | 10/1985 | Millot |
| 4,681,728 A | 7/1987 | Veronesi |
| 4,696,786 A | 9/1987 | Frizot |
| 4,716,013 A | 12/1987 | Veronesi |
| 4,851,183 A | 7/1989 | Hampel |
| 4,859,404 A | 8/1989 | Richard |
| 4,921,041 A | 5/1990 | Akachi |
| 5,253,702 A | 10/1993 | Davidson et al. |
| 5,466,114 A | 11/1995 | Swain |
| 5,669,729 A | 9/1997 | Attix |
| 5,711,629 A | 1/1998 | Attix |
| 5,761,260 A | 6/1998 | Bergamaschi |
| 6,266,386 B1 | 7/2001 | Patel |
| 6,275,556 B1 * | 8/2001 | Kinney ............... G21C 7/14 376/232 |
| 6,327,322 B1 | 12/2001 | Burton |
| 6,718,001 B2 | 4/2004 | Hidaka et al. |
| 6,810,099 B2 | 10/2004 | Nakamura et al. |
| 9,865,365 B2 | 1/2018 | Bang et al. |
| 2005/0077660 A1 | 4/2005 | Mucciardi et al. |
| 2012/0148007 A1 * | 6/2012 | Allen ............... G21C 7/12 376/228 |
| 2013/0223579 A1 | 8/2013 | Allen |
| 2016/0012924 A1 | 1/2016 | McClure et al. |

FOREIGN PATENT DOCUMENTS

| | | |
|---|---|---|
| FR | 2677164 | 12/1992 |
| FR | 2749435 | 5/1996 |
| JP | S58127385 | 8/1983 |
| JP | S6383693 | 4/1988 |
| KR | 200453164 | 4/2011 |

OTHER PUBLICATIONS

Westinghouse eVinciTM Micro Reactor (www.westinghousenuclear.com/New-Plants/eVinci-Micro-Reactor); Westinghouse Global Technology Office; Oct. 2017; 2 pages.

Heat pipe, Wikipedia, downloaded Feb. 26, 2018; 14 pages.

International Search Report and Written Opinion for PCT/US2017/069034; dated Dec. 29, 2017; 14 pages.

International Preliminary Report on Patentability for International Application No. PCT/US2017/069034, dated Jul. 11, 2019, pp. 9.

International Search Report and Written Opinion for PCT/US2018/067128; dated Jun. 13, 2019; 13 pages.

* cited by examiner

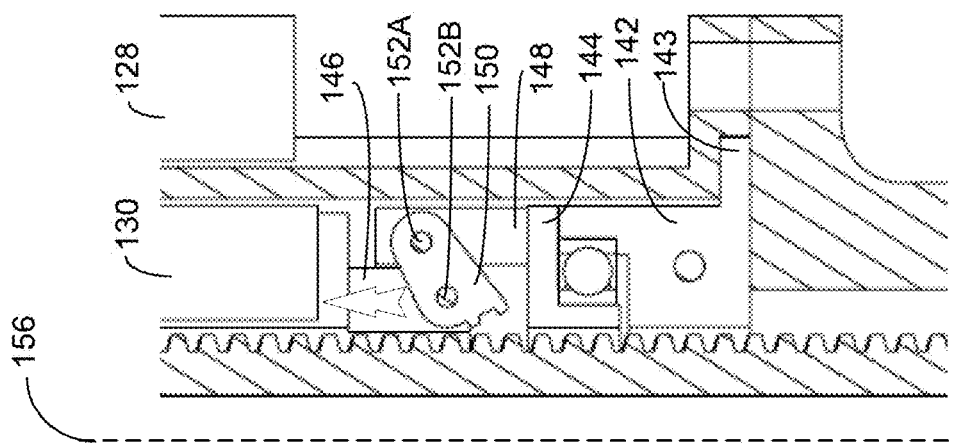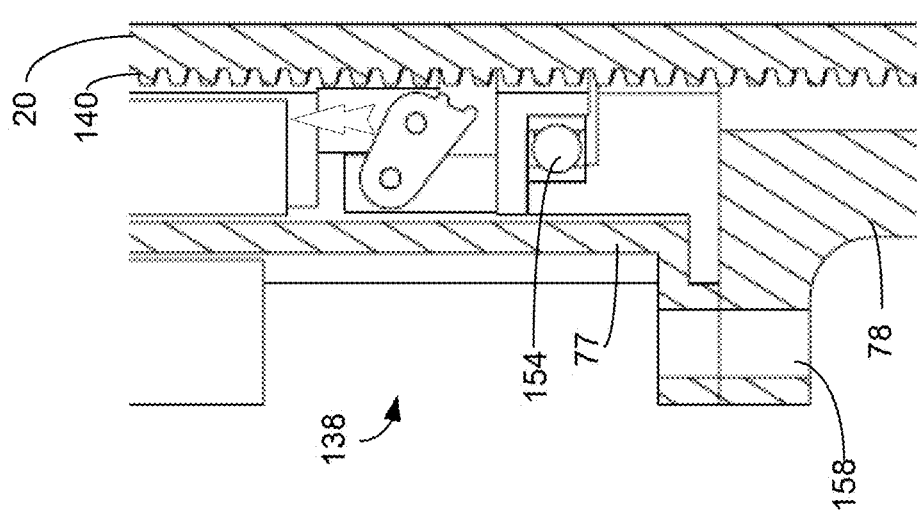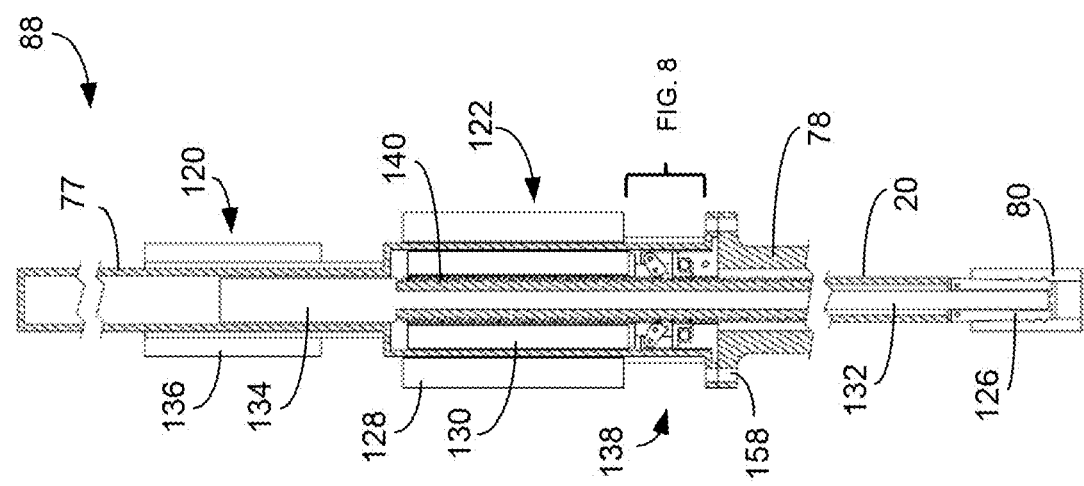

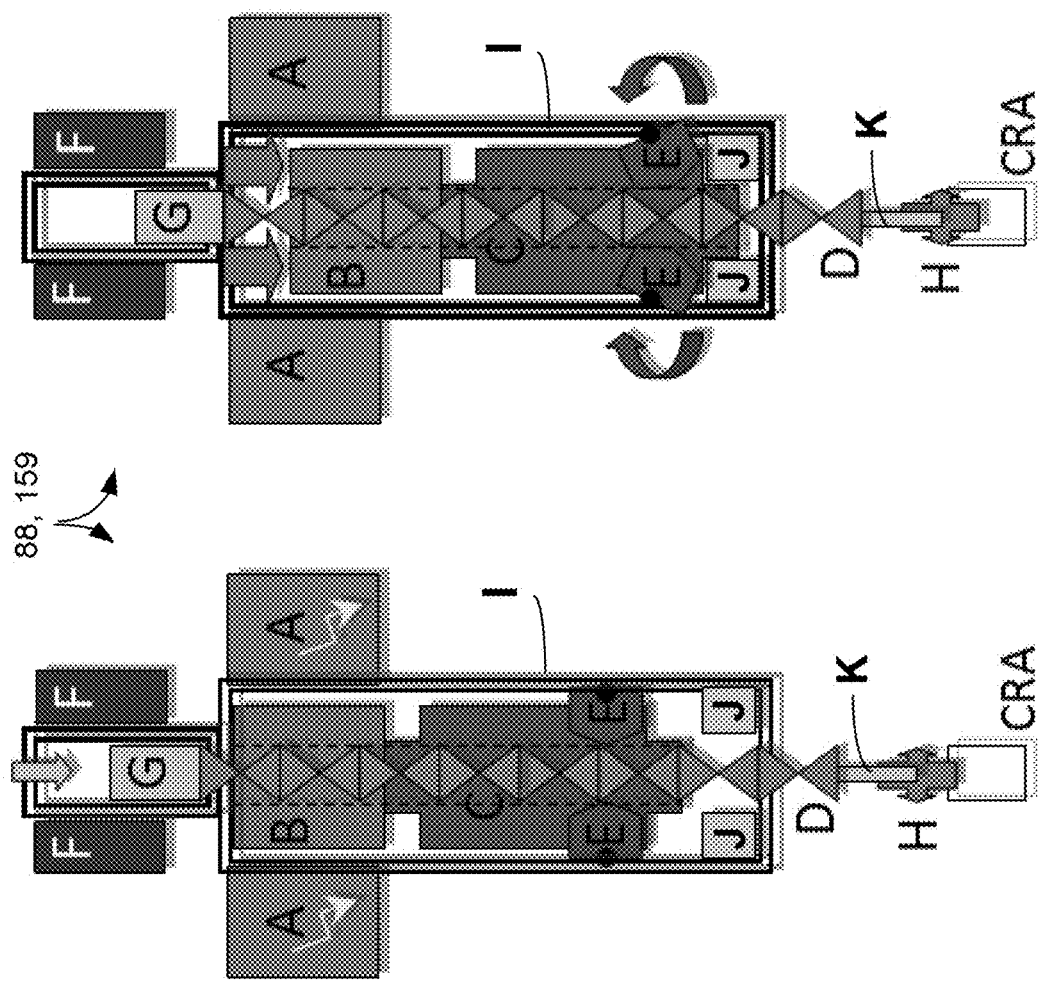

CONTROL ROD DRIVE MECHANISM (CRDM) WITH REMOTE DISCONNECT MECHANISM

This application claims priority to U.S. Provisional Patent Application No. 62/441,015, filed on Dec. 30, 2016 and entitled: CONTROL ROD DRIVE MECHANISM (CDRM) WITH REMOTE DISCONNECT MECHANISM, the contents of which are herein incorporated by reference in their entirety.

GOVERNMENT INTEREST

This invention was made with Government support under Contract No. DE-NE0000633 awarded by the Department of Energy. The Government has certain rights in this invention.

TECHNICAL FIELD

This disclosure generally relates to a control rod drive mechanism of a nuclear reactor with a feature to remotely disconnect the drive shaft from the control rod assembly.

BACKGROUND

Nuclear reactors may have control rod drive mechanisms (CRDM) located on top of a reactor pressure vessel (RPV) within an upper containment vessel (CNV). The CRDM components inside the reactor pressure vessel may need to maneuver or release drive shafts by gravity during a rapid control rod insertion (SCRAM). The CRDM may be driven remotely by electromagnetic force across the pressure vessel boundary. The CRDM also may need to release the drive shafts from attached control rod assemblies (CRA). This allows upper and lower sections of the RPV to be separated for refueling. The CRA are released and left in the reactor core to avoid a possible reactivity excursion.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIG. 7 is a side sectional view of the control rod drive mechanism in FIG. 5.

FIG. 8 is a further enlarged detail side sectional view of a single-hinge latch assembly within the control rod drive mechanism.

FIGS. 16A-16G are schematic diagrams showing different control rod drive mechanism (FIG. 5 or FIG. 12) operating states, wherein FIGS. 16A-16B illustrate an example process for using a drive mechanism to engage and linearly move a drive shaft.

FIGS. 16C-16G illustrate an example process for using a remote disconnect system to decouple a drive shaft from a control rod assembly.

DETAILED DESCRIPTION

A control rod drive mechanism includes a drive assembly located on top of a reactor pressure vessel. The drive assembly includes annular drive magnets extending around a top end of a drive shaft and annular drive coils on the outside of a pressure boundary. A latch assembly on the inside of the pressure boundary is coupled to annular drive magnets and engages with the drive shaft in response to actuation of the drive assembly. The drive coils also rotate the drive magnets and the engaged latch assembly to axially displace the drive shaft. Deactivating the drive coils disengages the latch assembly from the drive shaft, dropping a connected control rod assembly via gravity into a nuclear fuel assembly.

The control rod drive mechanism also may include a disconnect assembly with a disconnect magnet, coupled to a top end of a disconnect rod that extends through the drive shaft. Annular disconnect coils on the outside of the pressure boundary extend around the disconnect magnet to hold the disconnect magnet and the disconnect rod in a raised position, in order to remotely disconnect the drive shaft from, or reconnect to, the control rod assembly.

Figure 1:
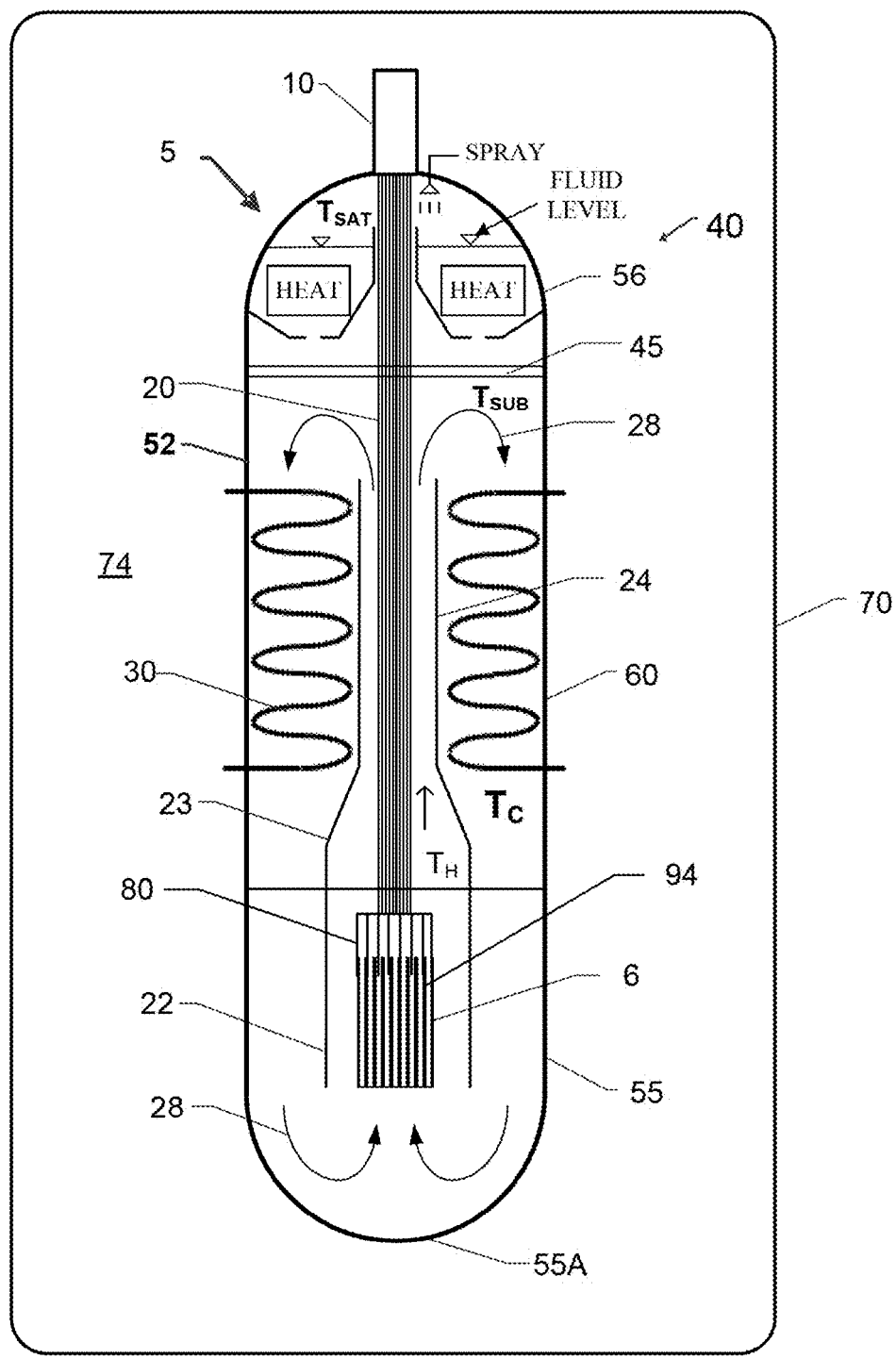
FIG. 1 shows a schematic diagram of an example nuclear reactor module.

FIG. 1 illustrates a cross-sectional view of an example integral reactor module 5 comprising reactor pressure vessel 52. Reactor core 6 is shown located near a lower head 55 of the reactor pressure vessel 52. The reactor core 6 may be located in a shroud 22 which surrounds reactor core 6 about its sides. A riser section 24 is located above the reactor core 6 surrounded by steam generators 30.

When primary coolant 28 is heated by reactor core 6 as a result of fission events, primary coolant 28 may be directed from shroud 22 up into an annulus 23 located above reactor core 6, and out of riser 24. This may result in additional primary coolant 28 being drawn into shroud 22 to be heated in turn by reactor core 6, which draws yet more primary coolant 28 into shroud 22. The primary coolant 28 that emerges from riser 24 may be cooled down by steam generators 30 and directed towards the outside of the reactor pressure vessel 52 and then returned to the bottom of the reactor pressure vessel 52 through natural circulation.

Primary coolant 28 circulates past the reactor core 6 to become high-temperature coolant TH and then continues up through the riser section 24 where it is directed back down the annulus and cooled off by steam generators 30 to become low-temperature coolant TC. One or more control rod drive mechanisms (CRDM) 10 are operably coupled to a number of drive shafts 20 that may be configured to interface with a plurality of control rod assemblies 80 located above reactor core 6.

A reactor pressure vessel baffle plate 45 may be configured to direct the primary coolant 28 towards a lower end 55 of the reactor pressure vessel 52. A surface of the reactor pressure vessel baffle plate 45 may come into direct contact with and deflect the primary coolant 28 that exits the riser section 24. In some examples, the reactor pressure vessel baffle plate 45 may be made of stainless steel or other materials.

The lower end 55 of the reactor pressure vessel 52 may comprise a ellipsoidal, domed, concave, or hemispherical portion 55A, wherein the ellipsoidal portion 55A directs the primary coolant 28 towards the reactor core 6. The ellipsoidal portion 55A may increase flow rate and promote natural circulation of the primary coolant through the reactor core 6. Further optimization of the coolant flow 28 may be obtained by modifying a radius of curvature of the reactor pressure vessel baffle plate 45 to eliminate/minimize boundary layer separation and stagnation regions.

The reactor pressure vessel baffle plate 45 is illustrated as being located between the top of the riser section 24 and a pressurizer region 40. The pressurizer region 40 is shown as comprising one or more heaters and a spray nozzle configured to control a pressure, or maintain a steam dome, within an upper end 56 or head of the reactor pressure vessel 52. Primary coolant 28 located below the reactor pressure vessel baffle plate 45 may comprise relatively sub-cooled coolant TSUB, whereas primary coolant 28 in the pressurizer region 40 in the upper end 56 of the reactor pressure vessel 52 may comprise substantially saturated coolant TSAT.

A fluid level of primary coolant 28 is shown as being above the reactor pressure vessel baffle plate 45, and within the pressurizer region 40, such that the entire volume between the reactor pressure vessel baffle plate 45 and the lower end 55 of the reactor pressure vessel 52 may be full of primary coolant 28 during normal operation of reactor module 5.

Shroud 22 may support one or more control rod guide tubes 94 that serve to guide control rod assemblies 80 that are inserted into, or removed from, reactor core 6. In some examples, drive shafts 20 may pass through reactor pressure vessel baffle plate 45 and through riser section 24 in order to control the position of control rod assemblies 80 relative to reactor core 6.

Reactor pressure vessel 52 may comprise a flange by which lower head 55 may be removably attached to an upper reactor vessel body 60 of reactor pressure vessel 52. In some examples, when lower head 55 is separated from upper reactor vessel body 60, such as during a refueling operation, riser section 24, baffle plate 45, and other internals may be retained within upper reactor vessel body 60, whereas reactor core 6 may be retained within lower head 55.

Additionally, upper reactor vessel body 60 may be housed within a containment vessel 70. Any air or other gases that reside in a containment region 74 located between containment vessel 70 and reactor pressure vessel 52 may be removed or voided prior to or during reactor startup. The gases that are voided or evacuated from the containment region 74 may comprise non-condensable gases and/or condensable gases. During an emergency operation, vapor and/or steam may be vented from reactor pressure vessel 52 into containment region 74, or only a negligible amount of non-condensable gas (such as hydrogen) may be vented or released into containment region 74.

Figure 2:
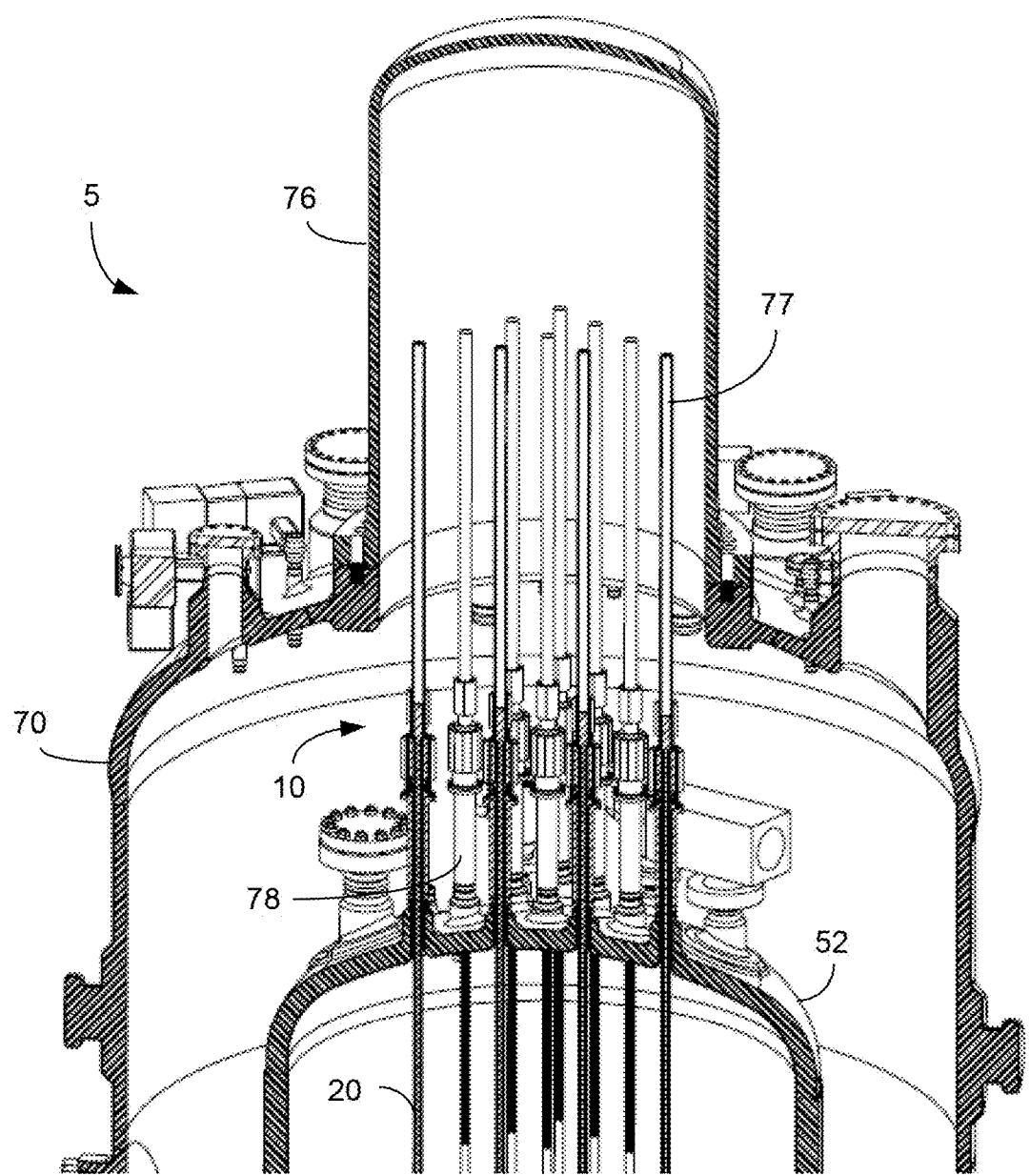
FIG. 2 is a perspective side sectional view of the upper head of a reactor pressure vessel with control rod drive mechanisms (CRDMs) inside a containment vessel.

FIG. 2 illustrates an upper cross-sectional view of reactor module 5 and example control rod drive mechanism (CRDM) assemblies 10. Reactor module 5 may comprise an upper containment vessel 76 housing at least a portion of the CRDM 10. A plurality of drive shaft housings 77 may be located within upper containment vessel 76. A plurality of drive shafts 20 associated with CRDMs 10 may be located in a reactor pressure vessel 52 that is housed in main containment vessel 70. Drive shaft housings 77 may be configured to house at least a portion of drive shafts 20 during operation of reactor module 5. In some examples, essentially all of the CRDMs 10 may be housed within main containment vessel 70.

Upper containment vessel 76 may be removably attached to main containment vessel 70. By removing upper containment vessel 76, the overall size and/or volume of reactor module 5 may be reduced, which may affect peak containment pressure and/or water levels. In addition to reducing the overall height of reactor module 5, the removal of upper containment vessel 76 from main containment vessel 70 may further reduce the weight and shipping height of reactor module 5. In some example reactor modules, several tons of weight may be removed for each foot that the overall height of reactor module 5 is decreased.

Reactor pressure vessel 52 and/or main containment vessel 70 may comprise one or more steel vessels. Additionally, main containment vessel 70 may comprise one or more flanges by which a top head or a bottom head of main containment vessel 70 may be removed from the containment vessel body, such as during a refueling operation.

During refueling, reactor module 5 may be relocated from an operating bay into a refueling bay, and a series of disassembly steps may be performed on the reactor module 5. The operating bay may be connected to the refueling bay by water, such that reactor module 5 is transported under water. Main containment vessel 70 may be disassembled, e.g., the top or bottom head may be separated from the containment vessel body, in order to gain access to CRDM 10 and/or to reactor pressure vessel 52. At this stage of refueling, reactor pressure vessel 52 may remain completely submerged in the surrounding water in the refueling bay. In some examples, an upper portion of CRDM 10, such as the plurality of drive shaft housings 77, may be located above water to facilitate access to CRDM 10 in a dry environment. In other examples, the entire CRDM 10 may be submerged in the pool of water in the refueling bay.

CRDMs 10 may be mounted to an upper head of reactor pressure vessel 52 by nozzles 78. Nozzles 78 may be configured to support CRDMs 10 when main containment vessel 70 is partially or completely disassembled during the refueling operation. Additionally, CRDMs 10 may be configured to support and/or control the position of drive shafts 20 within reactor pressure vessel 52.

Reactor pressure vessel 52 may comprise a substantially capsule-shaped vessel. In some examples, reactor pressure vessel 52 may be approximately 20 meters in height. Drive shafts 20 may extend from CRDMs 10, located at the upper head of reactor pressure vessel 52, into a lower head of reactor pressure vessel 52, so that they can be connected to control rod assemblies 80 that are inserted into reactor core 6 (FIG. 1). The distance from the upper head of reactor pressure vessel 52 to reactor core 6, while less than the overall height of reactor pressure vessel 52, may therefore result in the length of drive shafts 20 also being approximately 20 meters in length or, in some examples, somewhat less than the height of reactor pressure vessel 52.

Figure 3:
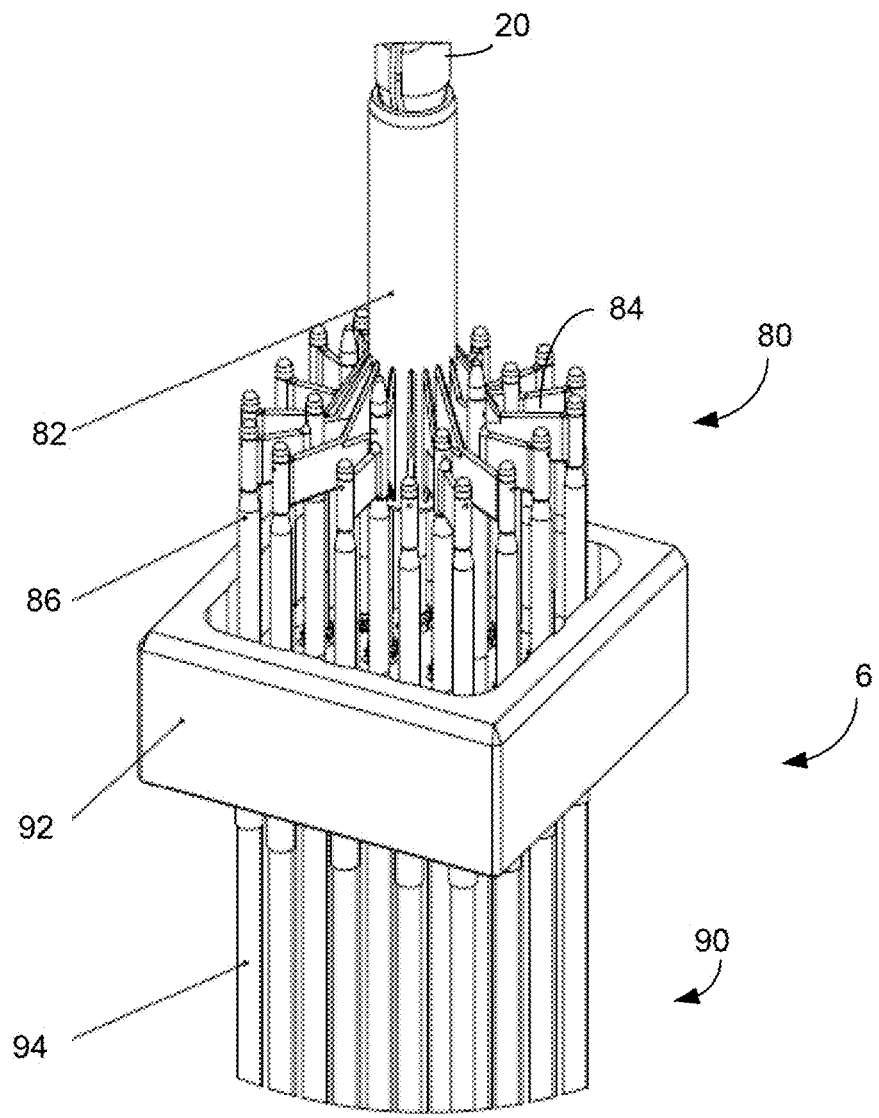
FIG. 3 is a perspective view of a control rod assembly partially inserted into a nuclear fuel assembly.

FIG. 3 is a perspective view of a control rod assembly 80 held partially above and partially inserted into a nuclear fuel assembly 90 in reactor core 6. As explained above, multiple drive shafts 20 extend down from rod drive mechanisms 10 to the top of reactor core 6. Control rod assembly 80 may include a cylindrical hub 82 that attaches to the bottom end of drive shaft 20. Arms 84 extend radially out from cylindrical hub 82 and attach at distal ends to top ends of control rods 86.

Control rods 86 extend into a nuclear fuel assembly 90 that is alternatively referred to as a fuel bundle that forms part of reactor core 6. Nuclear fuel assembly 90 may include a top nozzle 92 that supports multiple guide tubes 94. Guide tubes 94 extend down from nozzle 92 and in-between nuclear fuel rods (not shown). Control rods 86 control the fission rate of the uranium and plutonium in the nuclear fuel rods.

Control rods 86 are typically held by drive shaft 20 above nuclear fuel assembly 90 or held slightly inserted into nuclear fuel assembly 90. Reactor core 6 may overheat. A nuclear SCRAM operation is initiated where control CRDMs 10 in FIG. 1 release drive shafts 20 dropping control rods 86 down into guide tubes 94 and in-between the nuclear fuel rods.

Figures 4A, 4B:
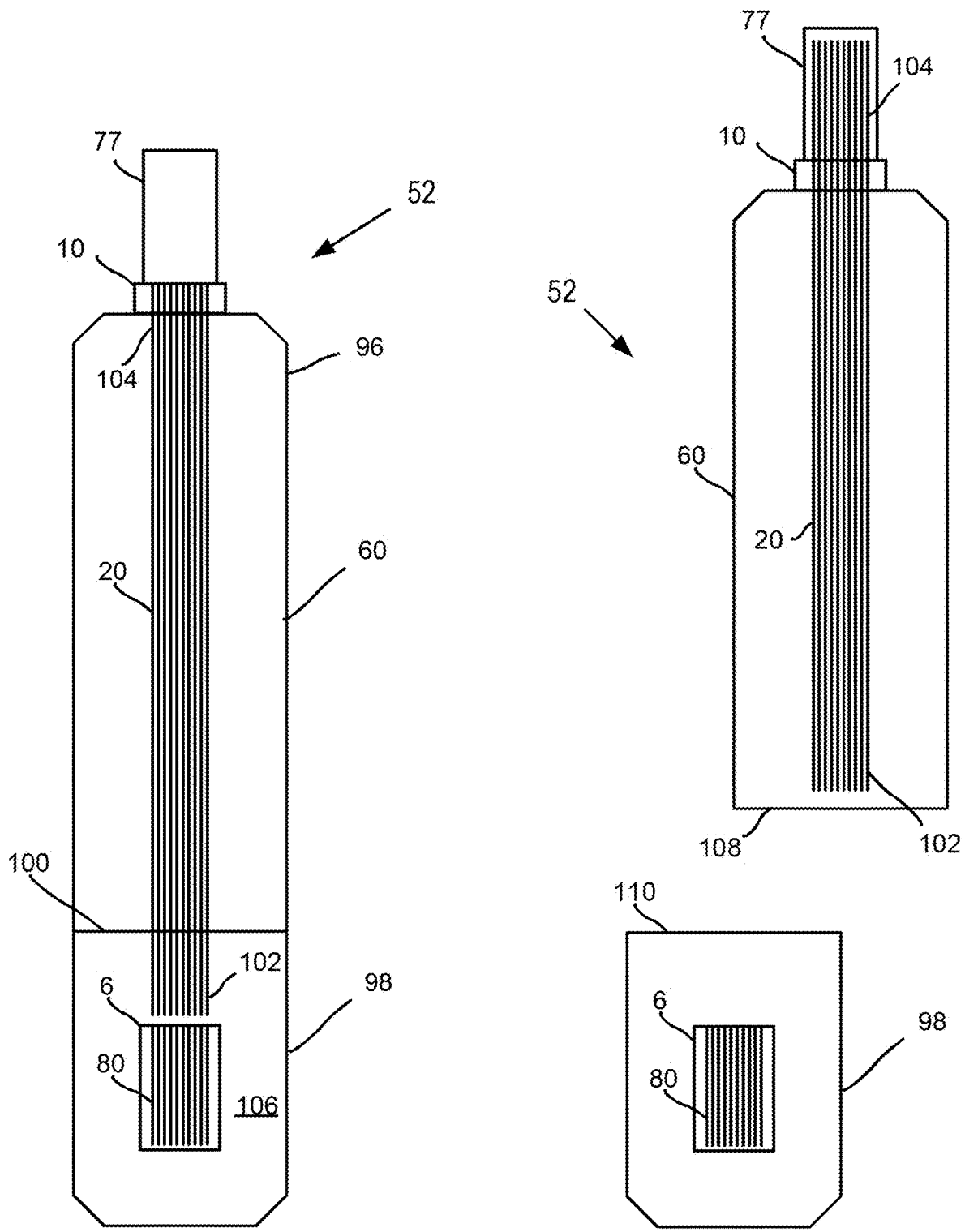
FIGS. 4A and 4B are schematic diagrams showing disassembly of a reactor pressure vessel.

FIG. 4A shows a cross-sectional view of an example reactor pressure vessel 52. CRDMs 10 may be mounted to an upper head 96 of reactor pressure vessel 52 and configured to support a plurality of drive shafts 20 that extend through the length of an upper reactor vessel body 60 of reactor pressure vessel 52 towards reactor core 6 located in a lower head 98 of reactor pressure vessel 52. In some examples, lower head 98 may be removably attached to upper reactor vessel body 60 at a flange 100, such as by a plurality of bolts.

In addition to housing a number of nuclear fuel rods, reactor core 6 may be configured to receive a plurality of control rod assemblies 80 that may be movably inserted between the fuel rods to control the power output of reactor core 6. When reactor core 6 is generating power, lower ends 102 of drive shafts 20 may be connected to control rod assemblies 80. Additionally, CRDMs 10 may be configured to control the location of control rod assemblies 80 within reactor core 6 by moving drive shafts 20 either up or down within reactor pressure vessel 52.

Upper ends 104 of drive shafts 20 may be housed in CRDM pressure housing 77 located above upper head 96 of reactor pressure vessel 52, such as when control rod assemblies 80 are removed from reactor core 6. In some examples, CRDM pressure housing 77 may comprise a single pressure vessel configured to house upper ends 104 of drive shafts 20. In other examples, CRDM pressure housing 77 may comprise individual housings for each of the drive shafts 20.

Lower ends 102 of drive shafts 20 are shown disconnected from control rod assemblies 80, such as may be associated with a refueling operation of reactor core 6. During an initial stage of the refueling operation, lower head 98 may remain attached to upper reactor vessel body 60 while drive shafts 20 are disconnected from control rod assemblies 80. Reactor pressure vessel 52 may remain completely sealed to the surrounding environment, which in some examples may comprise a pool of water that at least partially surrounds reactor pressure vessel 52, during the initial stage of the refueling operation.

CRDMs 10 may comprise remote disconnect mechanisms by which drive shafts 20 may be disconnected from control rod assemblies 80 without opening or otherwise disassembling reactor pressure vessel 52. In some examples, reactor pressure vessel 52 may form a sealed region 106 that surrounds reactor core 6, control rod assemblies 80, and lower ends 102 of drive shafts 20. By remotely disconnecting drive shafts 20, control rod assemblies 80 may remain within reactor core 6 when drive shafts 20 are withdrawn, at least partially, into CRDM pressure housing 77.

FIG. 4B illustrates the example reactor pressure vessel 52 of FIG. 4A partially disassembled. During the refueling operation, lower head 98 may be separated from upper reactor vessel body 60 of reactor pressure vessel 52. In some examples, lower head 98 may be held stationary in a refueling station while upper reactor vessel body 60 is lifted up by a crane and moved away from lower head 98 to facilitate access to reactor core 6.

Drive shafts 20 are shown in a retracted or withdrawn position, such that lower ends 102 may be completely retained within upper reactor vessel body 60 and/or CRDM pressure housing 77. For example, CRDMs 10 may be configured to raise lower ends 102 of drive shafts 20 above a lower flange 108 used to mount upper reactor vessel 60 together with an upper flange 110 of lower head 98. Withdrawing lower ends 102 of drive shafts 20 into upper reactor vessel body 60 may provide additional clearance between lower flange 108 and upper flange 110 during the refueling operation and further may keep drive shafts 20 from contacting external objects or getting damaged during transport and/or storage of upper reactor vessel body 60. Additionally, upper ends 104 of drive shafts 20 may similarly be housed and/or protected by CRDM pressure housing 77 when drive shafts 20 are in the retracted or withdrawn position.

As discussed above, control rod assemblies 80 may remain completely inserted in reactor core 6 during some or all of the refueling operation. In some examples, maintaining the insertion of control rod assemblies 80 within reactor core 6 may be dictated by nuclear regulatory and/or safety considerations.

Single-Hinge Type Control Rod Drive Mechanism

Figure 6:
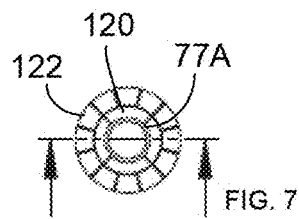
FIG. 6 is a plan view of the single-hinge type control rod drive mechanism.
Figure 5:
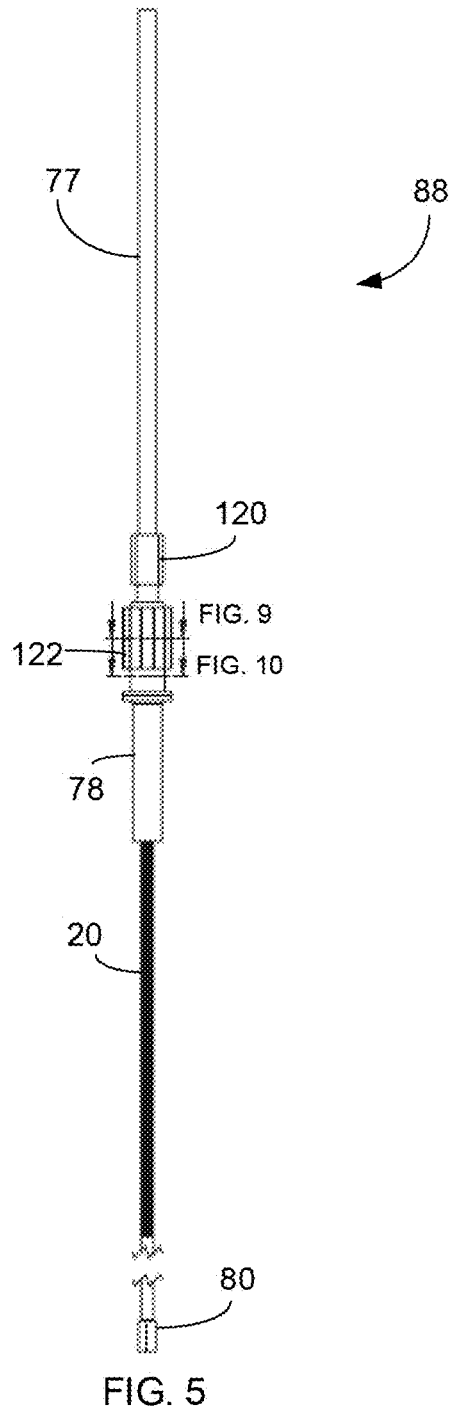
FIG. 5 is side view of a single-hinge type control rod drive mechanism.

FIG. 5 is a side view and FIG. 6 is a plan view of a single-hinge type control rod drive mechanism 88 that includes a remote disconnect mechanism. Referring to FIGS. 5 and 6, a drive shaft housing 77 extends over the top end of drive shaft 20 and around the latch mechanism 138. Drive shaft housing 77 is alternatively referred to as an upper pressure boundary.

As described above, drive shaft 20 enters reactor pressure vessel (RPV) 52 in FIG. 2 through a nozzle 78 connected on top to the bottom end of drive shaft housing 77. A bottom end of drive shaft 20 detachably connects to control rod assembly 80 as shown in more detail below.

Control rod drive mechanism 88 includes a drive assembly 122 that raises and lowers drive shaft 20 and attached control rod assembly 80. Control rod drive mechanism 88 also includes a disconnect assembly 120 that disconnects drive shaft 20 from control rod assembly 80. Both drive assembly 122 and disconnect assembly 120 may be remotely activated and controlled from outside of the RPV 52 via electrical control signals.

FIG. 7 is a side sectional view of control rod drive mechanism 88 and FIG. 8 is a more detailed sectional view of a single-hinge latch assembly 138 used in control rod drive mechanism 88. Referring to FIGS. 7 and 8, through-holes 158 are provided in drive shaft housing 77 and nozzle 78. Bolts (not shown) may be inserted into holes 158 to connect drive shaft housing 77 to nozzle 78 that extends up from the upper head of RPV 52 as shown above in FIG. 2.

A disconnect rod 132 extends through the entire length of drive shaft 20 and a cylindrical disconnect magnet 134 is attached to a top end of disconnect rod 132. Disconnect magnet 134 extends up into drive shaft housing 77 and annular disconnect coils 136 extend around drive shaft housing 77 and disconnect magnet 134. When activated, disconnect coils 136 may hold disconnect magnet 134 in a raised position allowing disconnect rod 132 to retract vertically upwards within drive shaft 20.

An upper end of drive shaft 20 includes a threaded outside surface 140. In one example, threads 140 may comprise ACME® type threads for linearly displacing drive shaft 20. Of course, any other type of threading or gearing also may be used. Drive shaft 20 extends from underneath disconnect magnet 134, through drive shaft housing 77 and nozzle 78, and into the upper head of RPV 52 (FIG. 1). Drive shaft 20 further extends through the length of RPV 52 and a bottom end includes a grapple 126 that connects to control rod assembly 80. Disconnect magnet 134 and disconnect coils 136 encompass the disconnect assembly 120.

An annular arrangement of drive coils 128 may extend around the outside of drive shaft housing 77 and an annular arrangement of drive magnets 130 inside of drive shaft housing 77 may extend around drive shaft 20. Continuously activating drive coils 128 may raise drive magnets 130. Alternating activation of alternating drive coils 128 in FIG. 8 also may rotate drive magnets 130 around a center axis 156 of drive shaft 20. Drive coils 128, drive magnets 130 and latch assembly 138 form the drive assembly 122.

A single-hinge latch assembly 138 is coupled on the bottom end to the drive shaft housing 77 and coupled on top to drive magnets 130. Latch assembly 138 includes an annular base 142 that includes a central opening that extends around drive shaft 20. A lip 143 extends out from an outside bottom end of base 142 and seats into a recess formed between the bottom end of drive shaft housing 77 and the top end of nozzle 78. Lip 143 functions as a hold-down holding base 142 down against the top surface of nozzle 78.

An annular collar 148 is rotationally attached to base 142 and includes a step 144 that attaches on top of bearings 154 that extend around the top of base 142. Collar 146 also includes a center opening that receives and extends around drive shaft 20. Collar 146 is held vertically/elevationally down onto base 142 but rotates about central axis 156 of drive shaft 20 on top of bearings 154 and base 142.

The outside end of a gripper 150 is pivotally attached to an upper end of collar 148 with a first pin 152A. The inside end of gripper 150 is pivotally attached to a bottom end of a latch 146 by a second pin 152B. A top end of latch 146 is attached to drive magnets 130. When drive magnets 130 are lowered a bottom end of latch 146 may sit on top of step 144 of collar 148.

When activated, drive coils 128 lift drive magnets 130 vertically upwards also lifting latch 146. Lifting latch 146 causes the inside ends of grippers 150 to rotate upwards engaging with threads 140 on drive shaft 20. The outside ends of grippers 150 rotate about pins 152A which are held vertically in place by collar 148.

After raising the inside ends of grippers 150, drive coils 128 may start rotating drive magnets 130 about central axis 156 of drive shaft 20. The bottom ends of drive magnets 130 start rotating raised latch 146 and attached gripper 150 around the outside circumference of drive shaft 20. Rotating gripper 150 also rotates collar 148 over the top of base 142 and around central axis 156 while remaining elevationally held down in place by base 142.

The inside end of grippers 150 rotate within threads 140 moving drive shaft 20 axially and linearly upwards inside of drive shaft housing 77 and nozzle 78. Drive coils 128 may rotate drive magnets 130 in an opposite direction, also rotating attached grippers 150 within threads 140 in an opposite direction. Accordingly, grippers 150 axially and linearly move drive shaft 20 in an upward or downward direction as directed by an electrical control system.

Deactivating drive coils 128 drops drive magnets 130 vertically downwards. Inside ends of grippers 150 also rotate downwards about pins 152B, disengaging from threads 140. Now released from grippers 150, drive shaft 20 is free to drop vertically downwards via gravity.

Figure 9:
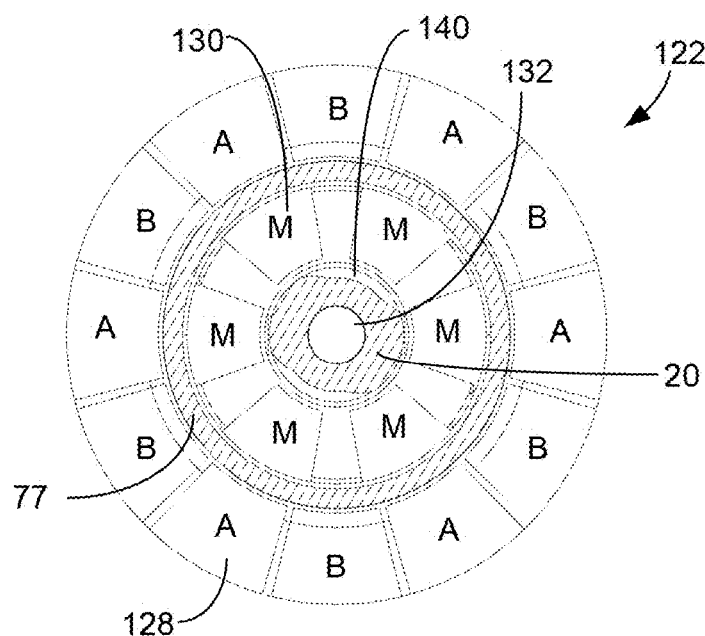
FIG. 9 is a cross-sectional plan view of a drive assembly.

FIG. 9 is a cross-sectional plan view of drive assembly 122. Annular drive coils 128 extend around the outside of drive shaft housing 77 and annular drive magnets 130 extend around the inside of drive shaft housing 77. Drive shaft 20 extends through a central opening formed in drive magnets 130 and disconnect rod 132 extends through a hole formed along the central axis of drive shaft 20. Threads 140 extend around the outside surface of drive shaft 20.

When continuously activated, drive coils 128 generate an electromagnetic field that vertically lifts up drive magnets 130. When drive coils 128 are activated in an alternating pattern, the electromagnetic field also rotates drive magnets 130 around the central axis causing drive assembly 122 to operate effectively like an electrical motor. For example, the electrical control system may activate drive coils A during a first period and activate drive coils B during an alternating second period. The alternating activation of drive coils A and B cause drive magnets M to rotate about a vertical axis that extends through drive shaft 20.

Figure 10:
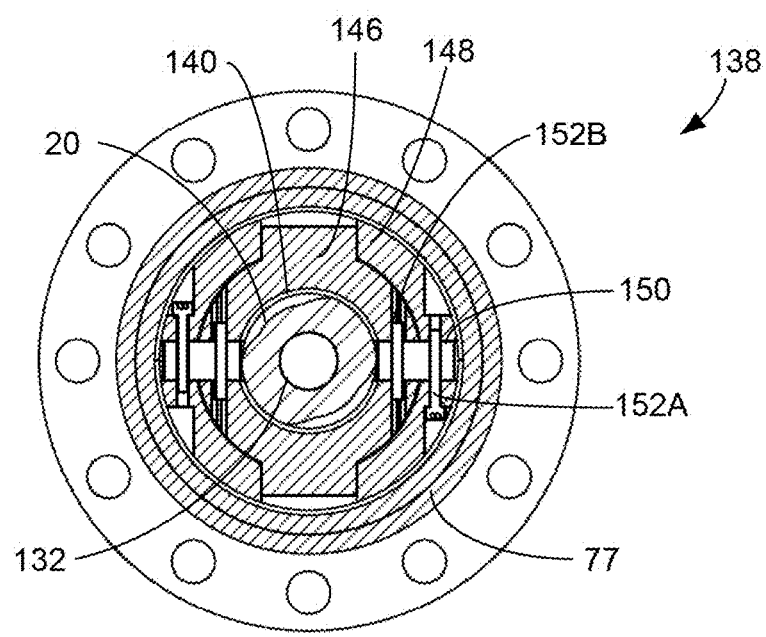
FIG. 10 is a cross-sectional plan view of the single-hinge latch assembly in FIG. 8.

FIG. 10 is a cross-sectional plan view of single-hinge latch assembly 138. Disconnect rod 132 extends through the center of drive shaft 20. Threads 140 extend around the outside surface of drive shaft 20. Latch 146 has an annular cross-sectional shape and attaches to the inside end of gripper 150 via pin 152B. Collar 148 also includes an annular cross-sectional shape and attached to the outside end of gripper 150 via pin 152A. As explained above, latch 146 is attached to drive magnets 130 and can move vertically up and down. Drive shaft housing 77 also has an annular cross-sectional shape concentrically aligned with drive shaft 20. Also note that any number of grippers 150 may be located around drive shaft 20. For example, four grippers 150 may be located 90 degrees apart around drive shaft 20.

Figure 11A:
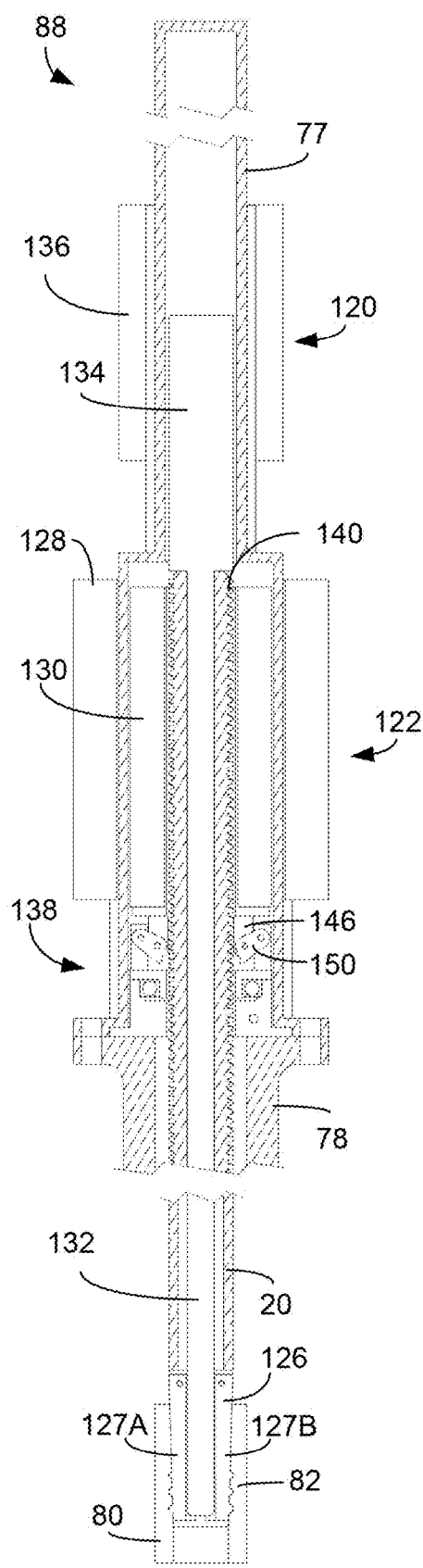
FIGS. 11A-11E show side sectional views of the single-hinge type control rod drive mechanism in FIG. 5 in different operating states.

FIGS. 11A-11E are side sectional views showing different operating positions of control rod drive mechanism 88. Referring to FIG. 11A, drive assembly 122 is shown in a lowered state. Drive coils 128 are deactivated and drive magnets 130 are in a lowered position, with the control rod assembly 80 fully inserted into reactor core 6 (FIG. 1). Lowered drive magnets 130 with attached latch 146 released grippers 150 from threads 140 of drive shaft 20.

During a loss of electric power or forced SCRAM, drive coils 128 may deactivate, allowing gravity to drop drive shaft 20 downward, disconnected from latch assembly 138. Attached control rod assembly 80 accordingly drops into fuel assembly 90 neutralizing reactor core 6 (see FIGS. 1 and 3). Thus, CRDM 88 has the advantage of automatically scramming reactor core 6 whenever deactivated during a power failure.

Disconnect assembly 120 is also shown in a lowered state. Disconnect coils 136 are deactivated and disconnect magnet 134 is in a lowered position sitting on top of drive shaft 20.

In the lowered position, the bottom end of disconnect rod 132 extends in-between reciprocating arms 127A and 127B of grapple 126. Spread-apart grapple arms 127A and 127B press against and lock into grooves in cylindrical hub 82 of control rod assembly 80.

Figure 11B:
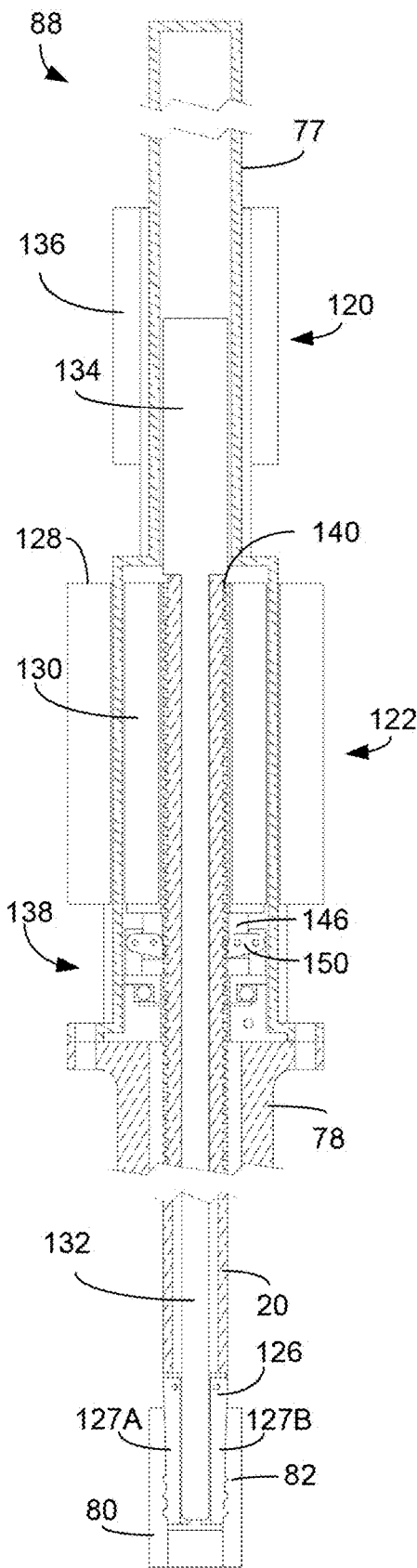

FIG. 11B shows drive assembly 122 in a raised state. Drive coils 128 are activated and drive magnets 130 are in a raised position. Raised drive magnets 130 raise attached latch 146 moving inside ends of grippers 150 upward, interlocking with threads 140 of drive shaft 20. Locked grippers 150 can raise or lower drive shaft 20 based on the rotational direction of drive magnets 130.

Disconnect assembly 120 is still shown in a lowered state where the bottom end of disconnect rod 132 remains inserted in-between grapple arms 127A and 127B. Spread-apart grapple arms 127A and 127B remain locked inside of cylindrical hub 82 locking the bottom end of drive shaft 20 to control rod assembly 80.

Figure 11C:
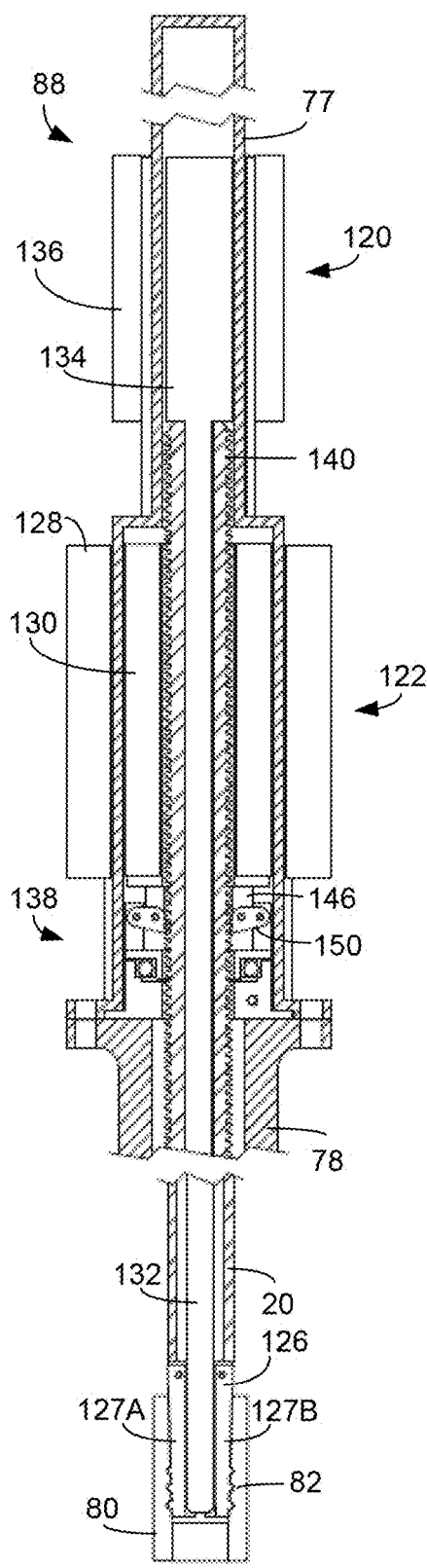

FIG. 11C shows drive assembly 122 in a raised state. Drive coils 128 are activated and drive magnets 130 are raised, moving attached latch 146 upward engaging inside ends of grippers 150 with threads 140. Drive coils 128 also may start rotating drive magnets 130 causing grippers 150 to rotate around engaged threads 140 of drive shaft 20. Rotating grippers 150 force drive shaft 20 axially and linearly upwards into drive shaft housing 77 and lift connected control rod assembly 80 by a short distance that does not cause a reactivity insertion into the reactor core (within a so-called dead band).

Raising drive shaft 20 also raises disconnect magnet 134, maintaining the bottom end of attached disconnect rod 132 in-between grapple arms 127A and 127B. In other words, raising drive shaft 20 and disconnect rod 132 together keeps the bottom end of drive shaft 20 attached to control rod drive mechanism 80, prior to the disconnection discussed below.

Figure 11D:
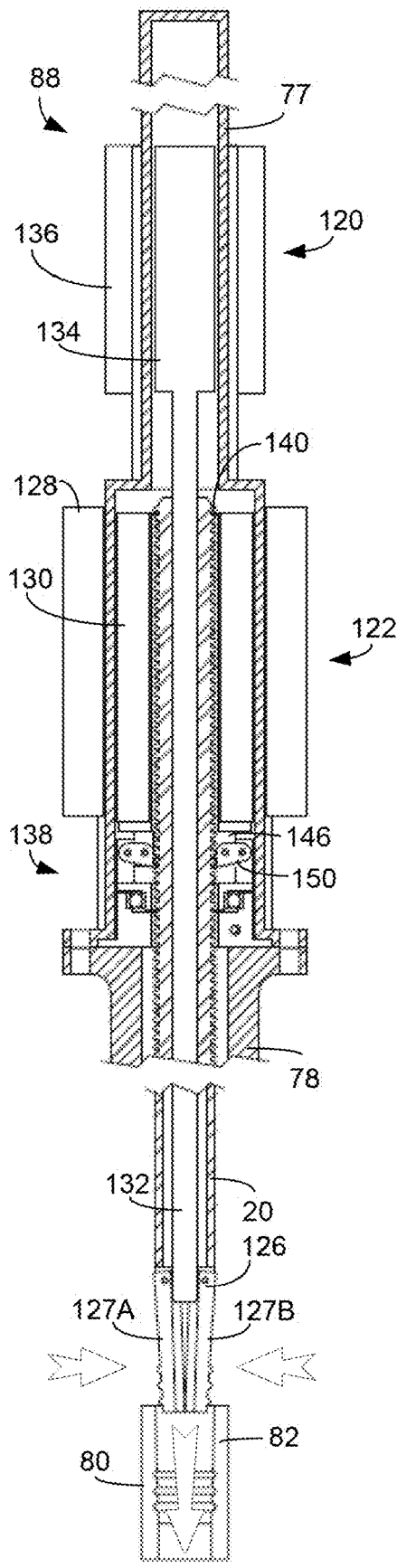

FIG. 11D shows drive assembly 122 in a lowered state and disconnect assembly 120 in a raised state. Disconnect coils 136 are activated when drive shaft 20 and disconnect magnet 134 are in the raised position shown in FIG. 11C. Drive coils 128 then may rotate drive magnets 130 in an opposite direction lowering drive shaft 20 vertically downward. At the same time, disconnect coils 136 hold disconnect magnet 134 in a raised position. As grippers 150 continue to move drive shaft 20 linearly downward, the bottom end of disconnect rod 132 slides up and out from in-between grapple 126. Grapple arms 127A and 127B accordingly reciprocate inwards disconnecting from control rod assembly 80, which drops a short distance. Alternatively, drive coils 128 are deactivated dropping drive shaft 20 and disconnecting control rod assembly 80, with disconnect coils 136 holding disconnect magnet 134 in a raised position.

Figure 11E:
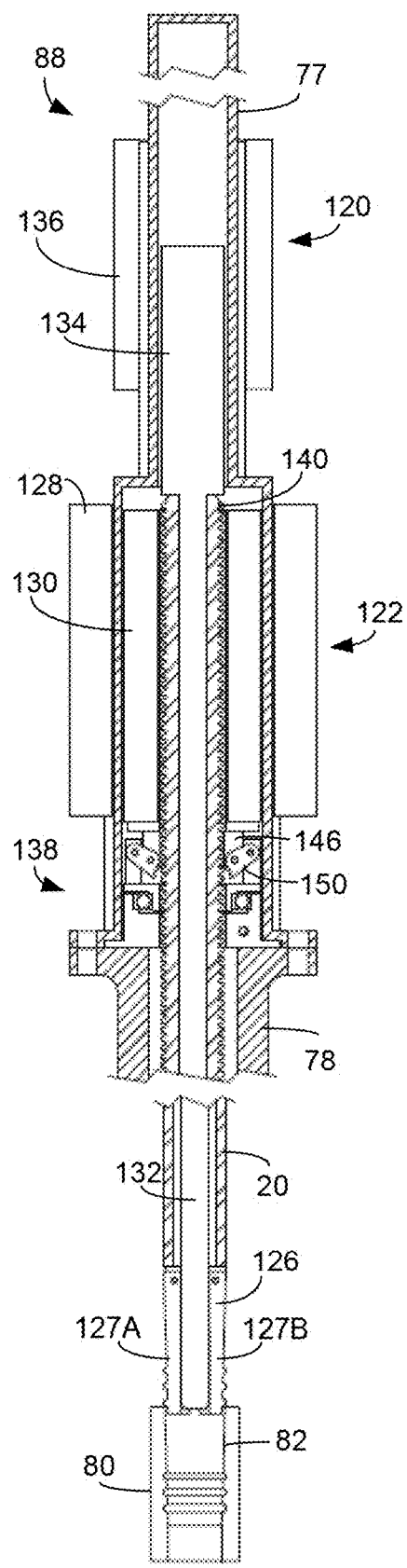

FIG. 11E shows disconnect assembly 120 and drive assembly 122 both in a lowered state. Deactivating disconnect coils 136 releases disconnect magnet 134 causing the bottom end of disconnect rod 132 to slide in-between grapple arms 127A and 127B. Drive coils 128 then may deactivate disconnecting grippers 150 from drive shaft 20. Spread-apart grapple 126 then sits on the top of control rod assembly 80.

Thus, drive coils 128 and disconnect coils 136 can be remotely activated and deactivated to linearly displace drive shaft 20 and also to disconnect drive shaft 20 from control rod assembly 80 during a reactor core refueling operation. Reconnecting the control rod assembly 80 after completion of refueling and re-assembly of reactor vessel 52 (FIGS. 4A and 4B) may be performed in reverse order of the steps shown in FIG. 11A to 11D.

Dual-Hinge Type Control Rod Drive Mechanism

Figure 12:
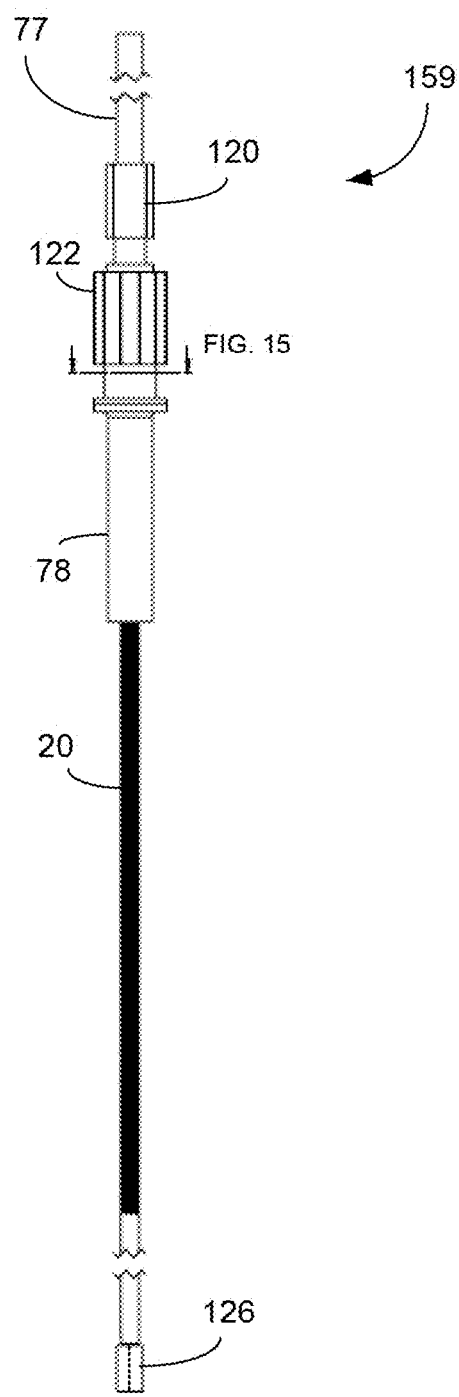
FIG. 12 is side view of a dual-hinge type control rod drive mechanism.
Figure 13A:
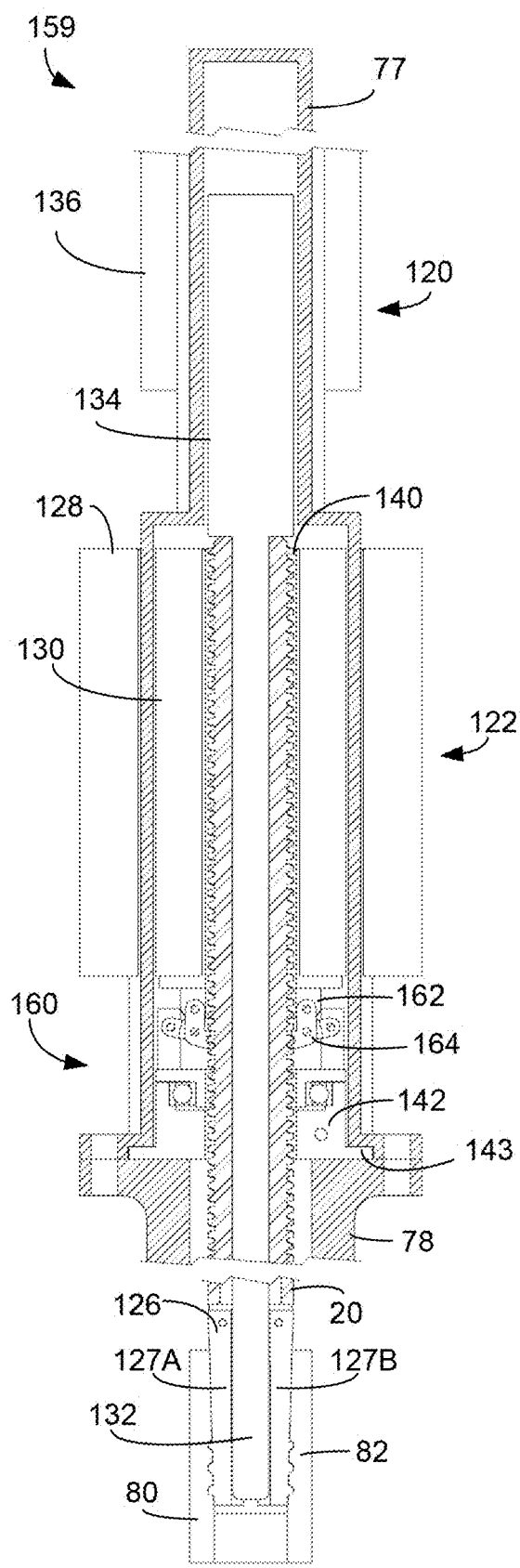
FIGS. 13A and 13B show side sectional views of the dual-hinge type control rod drive mechanism of FIG. 12 in different operating states.
Figure 13B:
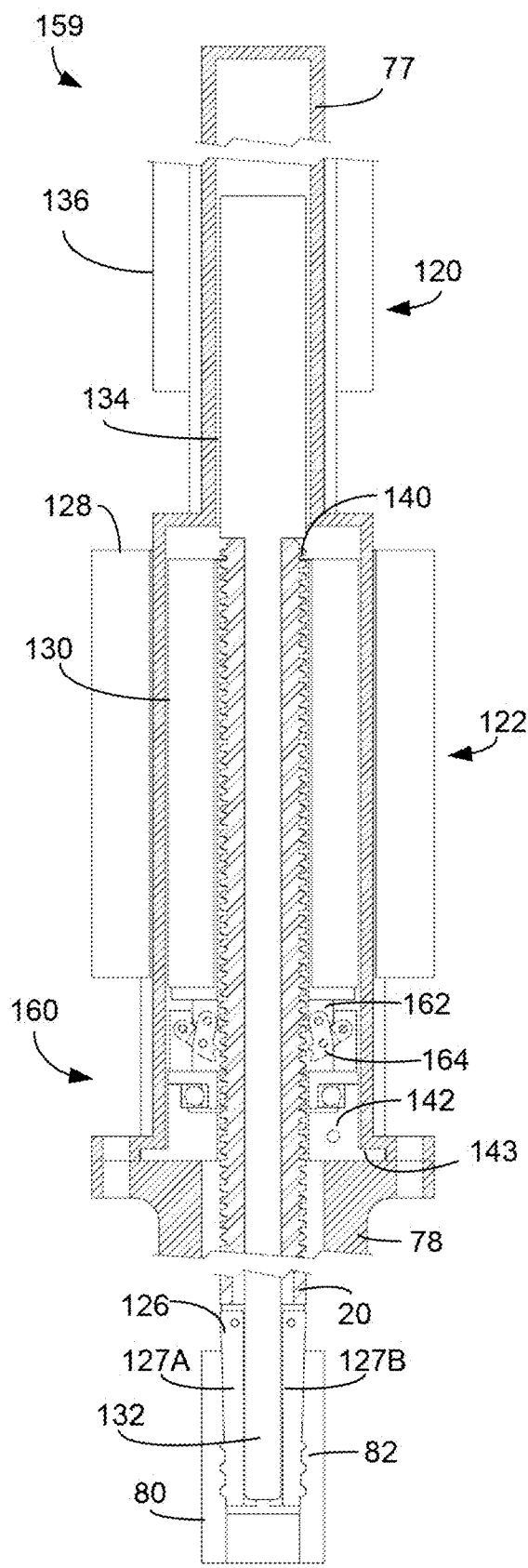
Figure 14:
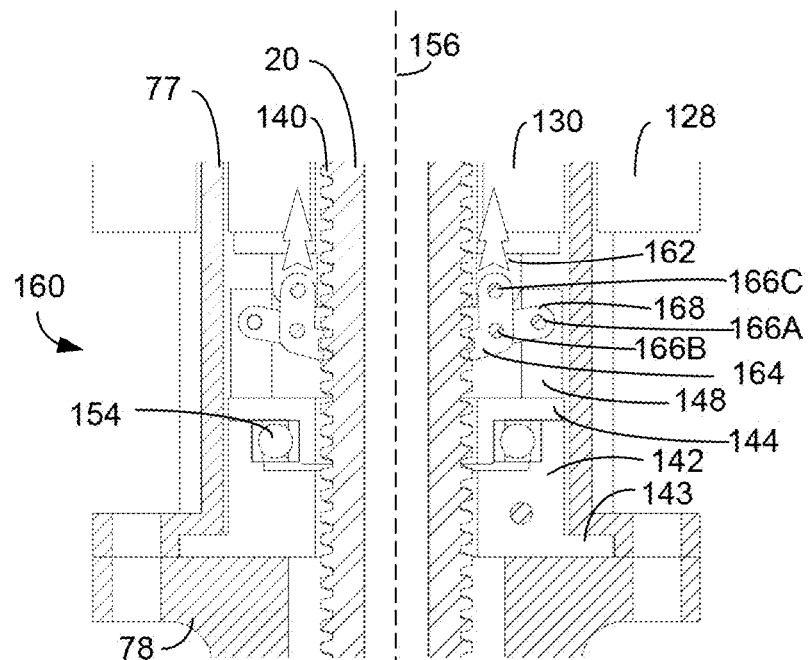
FIG. 14 is an enlarged side sectional view of a dual-hinge latch assembly within the control rod drive mechanism of FIG. 12.

FIG. 12 is a side view of a dual-hinge type control rod drive mechanism 159. FIGS. 13A and 13B are side sectional views of control rod drive mechanism 159. FIG. 14 is a more detailed view of the dual-hinge latch assembly 160.

Referring to FIGS. 12, 13A, 13B, and 14, drive assembly 122 and disconnect assembly 120 in control rod drive mechanism 159 include substantially the same drive and disconnect coils and magnets as described above. Drive shaft housing 77 and nozzle 78 are also all substantially the same as those described above. Disconnect rod 132, drive shaft 20, and threaded outside surface 140 are also similar to those described above.

Similar to above, continuously activating drive coils 128 may raise and align drive magnets 130 with annular drive coils 128. Alternating activation of adjacent drive coils 128 also may rotate drive magnets 130 around a central axis 156 of drive shaft 20, to force linear motion of drive shaft 20 and attached control rod assembly 80.

Dual-hinge latch assembly 160 is coupled at a bottom end to drive shaft housing 77 and coupled at a top end to drive magnets 130. Latch assembly 160 includes a similar base 142 at described above that includes a central opening that extends around drive shaft 20. A similar lip 143 extends out from an outside bottom end of base 142 and seats into a recess formed between the bottom end of drive shaft housing 77 and the top end of nozzle 78. Lip 143 functions as a hold-down holding base 142 down against a top surface of nozzle 78.

Referring to FIG. 13A, drive assembly 122 is shown in a raised state. Activating drive coils 128 raises drive magnets 130 and attached latch 162. The lower ends of grippers 164 move upwards and inwards engaging with threads 140 of drive shaft 20. Locked grippers 164 can then raise or lower drive shaft 20 based on the rotational direction of drive magnets 130.

Disconnect assembly 120 is shown in a lowered position where the bottom end of disconnect rod 132 is inserted in-between arms 127A and 127B of grapple 126. Spread-apart arms 127A and 127B lock inside of cylindrical hub 82 locking the bottom end of drive shaft 20 to control rod assembly 80.

Referring to FIG. 13B, drive assembly 122 and disconnect assembly 120 are shown in lowered states. Deactivating drive coils 128 lowers drive magnets 130 and attached latch 162. The grippers 164 move downwards and outwards disengaging with threads 140 of drive shaft 20.

Disconnect assembly 120 is still shown deactivated where the bottom end of disconnect rod 132 remains inserted in-between arms 127A and 127B of grapple 126. Spread-apart arms 127A and 127B remain locked inside of cylindrical hub 82 locking the bottom end of drive shaft 20 to control rod assembly 80.

In FIG. 14 an annular collar 148 similar in design to FIG. 8 is attached, but rotationally de-coupled, to base 142 and includes a similar step 144 that attaches on top of bearings 154 that extend around the top of base 142. Collar 146 also includes a center opening that receives and extends around drive shaft 20. Collar 146 is held vertically/elevationally down onto base 142 but rotates about central axis 156 of drive shaft 20 on top of bearings 154 and base 142.

The outside end of a hinge 168 is pivotally attached to a top end of collar 148 with a first pin 166A. The inside end of hinge 168 is pivotally attached to a lower end of a gripper 164 by a second pin 166B. The top end of a latch 162 is attached to drive magnet 130 and a bottom end of latch 162 is pivotally attached to a top end of gripper 164 by a third pin 166C.

When activated, drive coils 128 lift drive magnets 130 vertically upwards also raising latch 162. Gripper 164 and the inside end of hinge 168 also move upwards, moving the bottom end of gripper 164 inwards engaging with threads 140 of drive shaft 20.

After engaging the lower ends of grippers 164, drive coils 128 may start rotating drive magnets 130 about central axis 156 of drive shaft 20. The bottom ends of drive magnets 130 also start rotating raised latch 146 and engaged grippers 164 around drive shaft 20. Rotating grippers 164 also rotates collar 148 about central axis 156 while being held vertically down by base 142.

The inside ends of grippers 164 rotate within engaged threads 140 moving drive shaft 20 linearly upwards inside of drive shaft housing 77 and nozzle 78. Drive coils 128 may rotate drive magnets 130 in an opposite direction, thus rotating grippers 164 within threads 140 in an opposite direction axially moving drive shaft 20 downward.

Deactivating drive coils 128 drops drive magnets 130 and inside ends of grippers 164 downwards. Hinges 168 also rotate downwards and outwards disengaging the lower ends of grippers 164 from threads 140. Drive shaft 20 is now released from grippers 150 and is free to drop vertically downwards via gravity.

Figure 15:
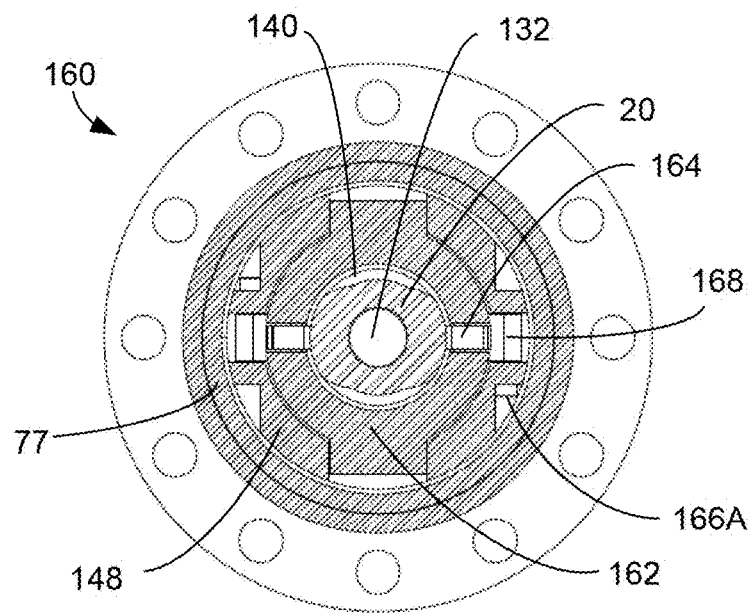
FIG. 15 is a cross-sectional plan view of the dual-hinge latch assembly of FIG. 14.

FIG. 15 is a cross-sectional plan view of dual-hinge latch assembly 160. Disconnect rod 132 extends through a centerline of drive shaft 20. Threads 140 extend around the outside surface of drive shaft 20. Latch 162 has an annular cross-sectional shape and attaches at the bottom end to the top end of gripper 164. Collar 148 also includes an annular cross-sectional shape and attaches to the outside end of hinge 168 via pin 166A. As explained above, collar 146 is attached to drive magnets 130 and can move vertically up and down. Drive shaft housing 77 also has an annular cross-sectional shape concentrically aligned with drive shaft 20.

FIGS. 16A-16G are simplified schematic diagrams showing different operations of the single-hinge type control rod drive mechanism 88 or double-hinge type control rod drive mechanism 159 described above, focusing on the primary elements to attain the CRDM functions described herein. For explanation purposes, the following abbreviations are used below.

Drive coils 128=A
Drive magnet 130=B
Latch 146, 162=C
Drive shaft 20=D
Grippers 150, 164=E
Disconnect coil 136=F
Disconnect magnet 134=G
Grapple 126=H
Drive shaft housing 77=I
Base 142=J
Disconnect rod 132=K
Control rod assembly 80=CRA Concentric electromagnetic coils A and F extend on the outside of drive shaft housing I, alternatively referred to as pressure boundary. Coils A and F on the outside interact to move cylindrical magnets B and G, respectively, inside pressure boundary I.

Figure 16C:
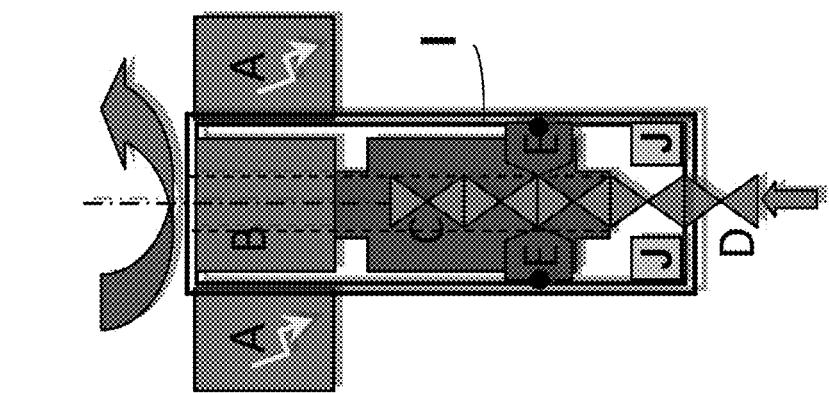
Figure 16B:
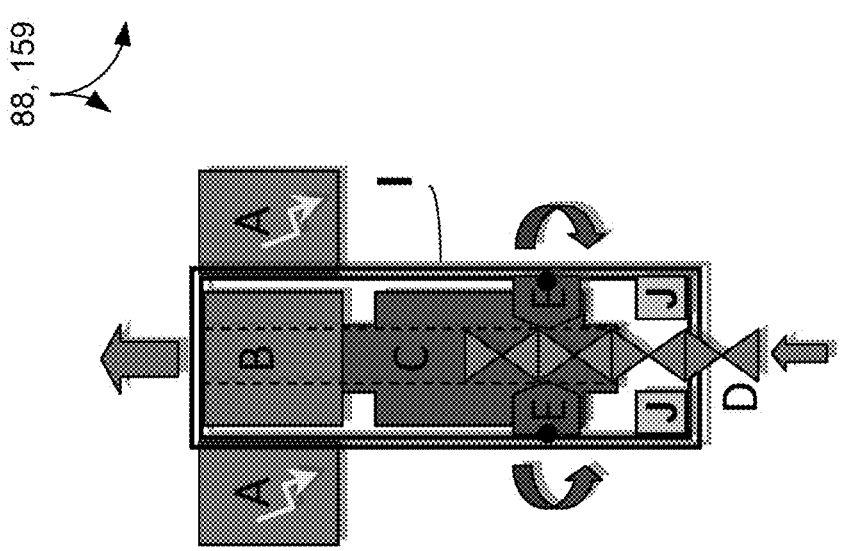
Figure 16A:
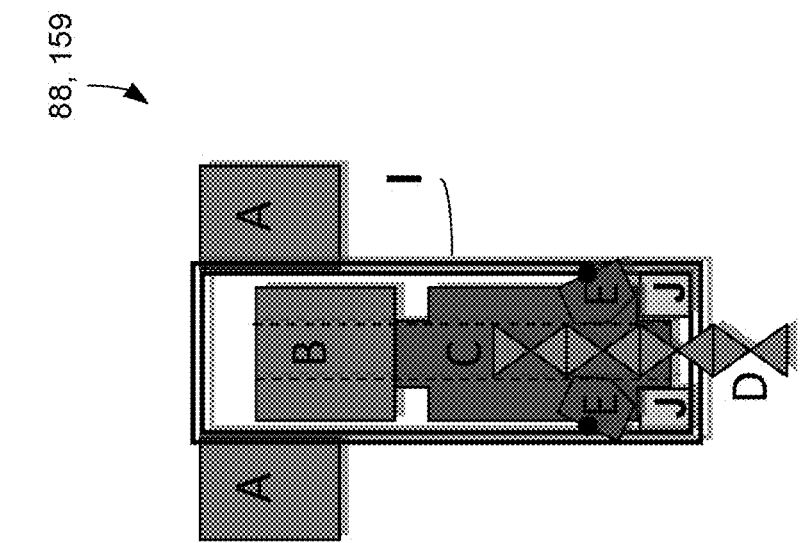

Referring to FIG. 16A, drive coils A are initially de-energized. Latch C is fixed to annular drive magnets B and rests on base J inside drive shaft housing I.

Referring to FIG. 16B, drive coils A are energized, lifting drive magnet B upwards until aligned with drive coils A. This lifts latch C and engages grippers E that pivot around pins that are vertically fixed with respect to the inside of pressure boundary I, yet allow for rotation of latch C. Grippers E fit into threaded grooves of drive shaft D.

Referring to FIG. 16C, by operating drive coils A in a specific sequence, drive magnet B and latch C are set into rotary motion, while at the same time still maintaining a same elevation as drive coils A. This precludes disengagement of grippers E. The rotary motion of grippers E translates into linear drive shaft motion that raises drive rod D and the attached CRA.

Referring back to FIG. 16A, upon a SCRAM signal or loss of electric power, drive coils A release drive magnet B causing grippers E to pivot down and outwards due to the drop of latch C. This provides a safety feature where a gravity-driven drop of drive shaft D drops attached CRA into the reactor core.

FIGS. 16D-16G show how to remotely disconnect drive shaft D from the CRA prior to disassembly of reactor pressure vessel 52 in FIGS. 4A and 4B. Drive coils A are initially de-energized and latch C is resting on base J. This may be similar to the initial drive shaft engagement configuration shown in FIG. 16A.

Figure 16E:
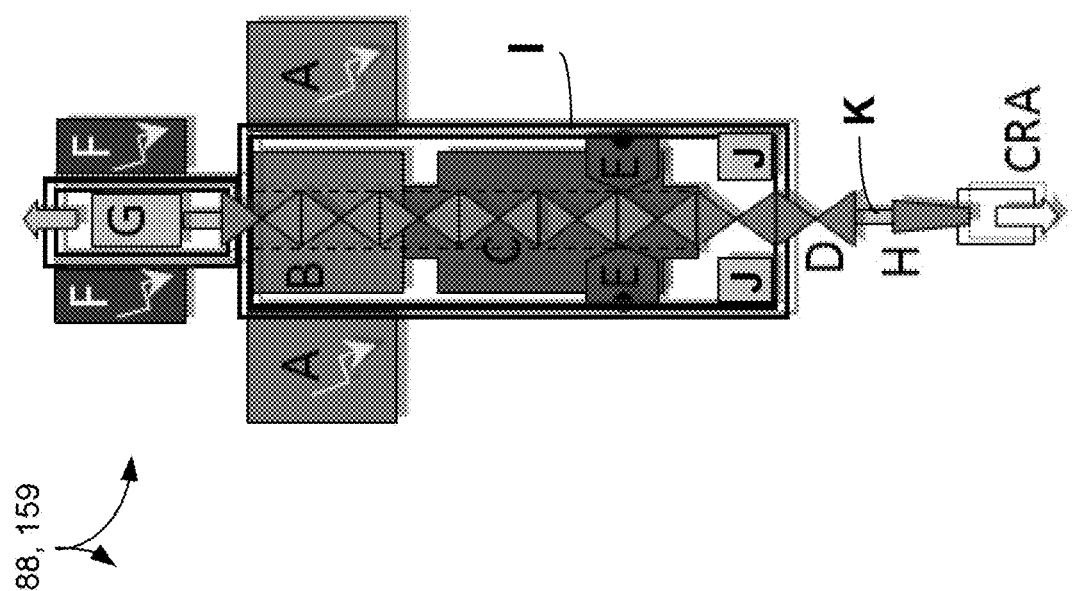
Figure 16D:
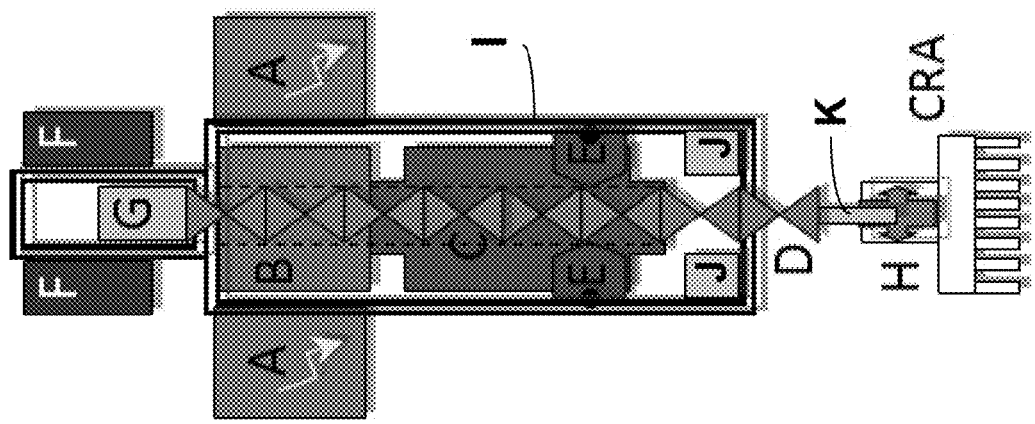

Referring to FIG. 16D, drive coils A are activated raising drive magnets B and latch C causing grippers E to engage with drive shaft D. As shown above in FIG. 11C, drive coils A then set drive magnet B and latch C into rotary motion, while at the same time maintaining a same elevation as drive coils A. Rotating grippers E move drive shaft D and disconnect magnet G linearly upwards into raised positions, lifting the attached CRA by a short distance that does not cause a reactivity insertion into the reactor core (within a so-called dead band).

Referring to FIG. 16E, drive coils A are still energized holding drive magnet B, drive shaft D, disconnect magnet G, and disconnect rod K in raised positions. Disconnect coil F is energized holding disconnect magnet G and attached disconnect rod K vertically in place. Drive coils A then may rotate drive magnet B, latch C, and gripper E in an opposite direction linearly lowering drive shaft D. Grapple H on the bottom end of drive shaft D currently holds the CRA, and the bottom end of disconnect rod K starts moving up and out from the grapple arms. The arms of grapple H contract causing the CRA to drop by a short distance, until it rests again on top of the nuclear fuel assembly top nozzle 92 in FIG. 3.

Referring to FIG. 16F, drive coils A remain energized and therefore hold drive magnet B in place. Disconnect coil F is then de-energized. This releases disconnect magnet G causing the bottom end of disconnect rod K to insert into and expand grapple H on the bottom of drive shaft D.

Referring to FIG. 16G, drive coils A are de-energized releasing annular drive magnet B and latch C. Drive shaft D drops by a short distance until grapple H rests on top of the CRA cylindrical hub without being engaged. This allows the upper and lower sections of the reactor pressure vessel to be separated for refueling without removing the CRA.

Re-connection of grapple H to the CRA is performed in reverse order. Drive coils A may move drive shaft D and disconnect magnet G vertically up into raised positions. Disconnect coils F may activate holding disconnect magnet G and disconnect rod K in the raised position. Drive coils A then may lower drive shaft D contracting and inserting grapple H into the CRA. Disconnect coils F then may be deactivated dropping disconnect magnet G and the bottom of disconnect rod K in-between grapple H. Grapple H expands locking into the CRA.

Alternatively, grapple H is reengaged with the CRA by pulling up disconnect magnet G using the electromagnetic force of disconnect coil F. Disconnect magnet G is moved into the raised position without simultaneously energizing drive coil A. The weight of drive shaft D may be large enough so that only disconnect rod K moves upwards inside of drive shaft D. Grapple H contracts inserting into the CRA cylindrical hub. Disconnect coils F are then deactivated so the bottom of disconnect rod K drops back down into grapple H. Grapple H expands locking into the CRA.

Having described and illustrated the principles of a preferred embodiment, it should be apparent that the embodiments may be modified in arrangement and detail without departing from such principles. Claim is made to all modifications and variation coming within the spirit and scope of the following claims.

Some of the operations described above may be implemented in software and other operations may be implemented in hardware. One or more of the operations, processes, or methods described herein may be performed by an apparatus, device, or system similar to those as described herein and with reference to the illustrated figures.

It will be apparent to one skilled in the art that the disclosed implementations may be practiced without some or all of the specific details provided. In other instances, certain process or methods have not been described in detail in order to avoid unnecessarily obscuring the disclosed implementations. Other implementations and applications also are possible, and as such, the following examples should not be taken as definitive or limiting either in scope or setting.

References have been made to accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope.

Although the examples provided herein have primarily described a pressurized water reactor and/or a light water reactor, it should be apparent to one skilled in the art that the examples may be applied to other types of power systems. For example, the examples or variations thereof may also be made operable with a boiling water reactor, sodium liquid metal reactor, gas cooled reactor, pebble-bed reactor, and/or other types of reactor designs.

It should be noted that examples are not limited to any particular type of reactor cooling mechanism, nor to any particular type of fuel employed to produce heat within or associated with a nuclear reaction. Any rates and values described herein are provided by way of example only. Other rates and values may be determined through experimentation such as by construction of full scale or scaled models of a nuclear reactor system.

Having described and illustrated the principles of a preferred embodiment, it should be apparent that the embodiments may be modified in arrangement and detail without departing from such principles. Claim is made to all modifications and variation coming within the spirit and scope of the following claims.

The invention claimed is:

1. A control rod drive mechanism comprising:
   a drive assembly located on a top end of a reactor pressure vessel, the drive assembly including annular drive magnets extending around a top end of a drive shaft and annular drive coils extending around the drive magnets, separated by a pressure boundary;
   a latch assembly coupled to the drive magnets configured to engage the drive shaft in response to actuation of the drive assembly, the drive coils further configured to rotate the drive magnets and the engaged latch assembly and axially displace the drive shaft; and
   a disconnect assembly, including
      a disconnect magnet coupled to a top end of a disconnect rod that extends entirely through the drive shaft; and
      annular disconnect coils extending around the disconnect magnet, separated by a pressure boundary, configured to hold the disconnect magnet and the disconnect rod in a raised position to disconnect the drive shaft from a control rod assembly.

2. The control rod drive mechanism of claim 1, wherein:
   activation of the drive coils raises the drive magnets engaging the latch assembly with the drive shaft; and
   deactivation of the drive coils drops the drive magnets disengaging the latch assembly and dropping the drive shaft via gravity.

3. The control rod drive mechanism of claim 1, further comprising threads located around the top end of the drive shaft, wherein the latch assembly is configured to engage with the threads when the drive coils are activated and axially displace the drive shaft when the drive magnets rotate the latch assembly around the engaged threads.

4. The control rod drive mechanism of claim 1, wherein the latch assembly includes:
   a base held down at a bottom end to a drive shaft housing;
   a collar coupled vertically to, but rotationally de-coupled from the top end of the base through bearings;
   a latch coupled at a top end to the drive magnets; and
   a gripper pivotally coupled to a bottom end of the latch and pivotally coupled on the top end to the collar.

5. The control rod drive mechanism of claim 4, wherein raising the drive magnets with the drive coils raises the latch and engages the first end of the gripper with a threaded outside surface of the drive shaft.

6. The control rod drive mechanism of claim 5, wherein rotating the raised drive magnets with the drive coils causes the engaged gripper to rotate against the threaded outside surface axially displacing the drive shaft.

7. The control rod drive mechanism of claim 1, wherein the latch assembly includes:
   a base coupled at a bottom end to the drive shaft housing;
   a collar coupled vertically to, but rotationally de-coupled from the top end of the base;
   a latch coupled at a top end to the drive magnets;
   a hinge pivotally coupled at a first end to a top end of the collar; and
   a gripper pivotally coupled at a first end to a second end of the hinge and pivotally coupled at a second end to a bottom end of the latch.

8. The control rod drive mechanism of claim 7, wherein activating the drive coils raises the drive magnets and the attached latch, moving the second end of the gripper upwards and inwards engaging with a threaded outside surface of the drive shaft.

9. The control rod drive mechanism of claim 1, further comprising:
- a drive shaft housing extending up from a top end of the reactor pressure vessel; and
- the drive shaft, wherein the top end of the drive shaft extends into the drive shaft housing, wherein a bottom end of the drive shaft is coupled to the control rod assembly, and wherein the control rod assembly is located at a bottom end of the reactor pressure vessel.

10. The control rod drive mechanism of claim 9, wherein
- the annular drive magnets are located within the drive shaft housing coupled; and
- the annular drive coils extend around the drive shaft housing.

11. The control rod drive mechanism of claim 10, wherein
- the disconnect magnet is in the drive shaft housing above the top end of the drive shaft,
- the disconnect rod connects at a bottom end to a grapple that connects to the control rod assembly,
- the annular disconnect coils extend around the drive shaft housing, and
- the disconnect coils are configured to hold the disconnect magnet in the raised position to control the grapple.

12. The control rod drive mechanism of claim 11, wherein linearly displacing the drive shaft upwards with the latch assembly causes the top end of the drive shaft to vertically raise up the disconnect magnet and the disconnect rod.

\* \* \* \* \*

UNITED STATES PATENT AND TRADEMARK OFFICE
CERTIFICATE OF CORRECTION

PATENT NO. : 10,847,272 B2
APPLICATION NO. : 15/858727
DATED : November 24, 2020
INVENTOR(S) : Christian Lobscheid It is certified that error appears in the above-identified patent and that said Letters Patent is hereby corrected as shown below:

On the page 2, in Column 2, under "Other Publications", Line 1, delete "eVinviTM" and insert -- eVinci™ --, therefor.

In Column 1, Line 4, below "MECHANISM" insert -- RELATED APPLICATIONS --, therefor.

In Column 1, Line 7, delete "(CDRM)" and insert -- (CRDM) --, therefor.

In Column 2, Line 18, delete "operating states, wherein" insert -- operating states --, therefor.

In Column 10, Line 3, delete "FIG." and insert -- FIGS. --, therefor.

In Column 14, Line 2, in Claim 1, delete "mechanism" and insert -- mechanism, --, therefor.

In Column 15, Line 12, in Claim 10, delete "housing coupled;" and insert -- housing; --, therefor.

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*